(12) United States Patent
Okamoto et al.

(10) Patent No.: US 11,428,422 B2
(45) Date of Patent: Aug. 30, 2022

(54) AIR CONDITIONING SYSTEM

(71) Applicant: DAIKIN INDUSTRIES, LTD., Osaka (JP)

(72) Inventors: Yasunori Okamoto, Osaka (JP); Naotoshi Fujita, Osaka (JP); Kouji Tatsumi, Osaka (JP); Masaaki Kawagishi, Osaka (JP); Shinya Umase, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 17/554,871

(22) Filed: Dec. 17, 2021

(65) Prior Publication Data

US 2022/0107098 A1 Apr. 7, 2022

Related U.S. Application Data

(63) Continuation of application No. PCT/JP2020/022739, filed on Jun. 9, 2020.

(30) Foreign Application Priority Data

Jun. 26, 2019 (JP) .............................. JP2019-118856

(51) Int. Cl.
*F24F 3/14* (2006.01)
*F24F 1/00* (2019.01)
(Continued)

(52) U.S. Cl.
CPC .............. *F24F 3/14* (2013.01); *F24F 1/0087* (2019.02); *F24F 11/41* (2018.01); *F24F 11/64* (2018.01);
(Continued)

(58) Field of Classification Search
CPC ..... F24F 3/14; F24F 11/41; F24F 11/64; F24F 11/65; F24F 11/74; F24F 11/80; F24F 1/0087
See application file for complete search history.

(56) References Cited

U.S. PATENT DOCUMENTS

2004/0099411 A1 5/2004 Kensok et al.
2013/0213079 A1 8/2013 Ito et al.
(Continued)

FOREIGN PATENT DOCUMENTS

JP 2005-49059 A 2/2005
JP 2005-315560 A 11/2005
(Continued)

OTHER PUBLICATIONS

English Translation of the International Preliminary Report on Patentability and Written Opinion of the International Searching Authority for International Application No. PCT/JP2020/022739, dated Jan. 6, 2022.
(Continued)

*Primary Examiner* — Marc E Norman
(74) *Attorney, Agent, or Firm* — Birch, Stewart, Kolasch & Birch, LLP

(57) ABSTRACT

When an outdoor air handler performs a heating humidifying operation and an air conditioner performs a cooling operation, a control device adjusts at least one of a to-be-supplied air temperature of the outdoor air handler, a to-be-supplied air flow rate of the outdoor air handler, a to-be-supplied water flow rate of the outdoor air handler, and a cooling temperature that is a temperature at an air heat exchanger of the air conditioner. The control device adjusts the to-be-supplied air temperature and the cooling temperature on the basis of dehumidification information, operation information, temperature information, and humidity information. The operation information is information regarding an operating state of the air conditioner.

8 Claims, 4 Drawing Sheets

(51) Int. Cl.
*F24F 11/41* (2018.01)
*F24F 11/64* (2018.01)
*F24F 11/65* (2018.01)
*F24F 11/74* (2018.01)
*F24F 11/80* (2018.01)
*F24F 1/0087* (2019.01)

(52) U.S. Cl.
CPC .............. *F24F 11/65* (2018.01); *F24F 11/74* (2018.01); *F24F 11/80* (2018.01)

(56) References Cited

U.S. PATENT DOCUMENTS

| 2015/0316276 | A1 | 11/2015 | Matsugi |
| 2020/0080742 | A1 | 3/2020 | Okamoto et al. |
| 2022/0082289 | A1* | 3/2022 | Okamoto ................ F24F 11/74 |
| 2022/0099325 | A1* | 3/2022 | Okamoto ................ F24F 11/63 |

FOREIGN PATENT DOCUMENTS

| JP | 2006-329471 A | 12/2006 |
| JP | 2010-107059 A | 5/2010 |
| JP | 2010-151421 A | 7/2010 |
| JP | 2014-134343 A | 7/2014 |
| JP | 2017-142003 A | 8/2017 |
| JP | 2018-112356 A | 7/2018 |
| JP | 2018-173264 A | 11/2018 |
| WO | WO 2012/085969 A1 | 6/2012 |

OTHER PUBLICATIONS

International Search Report for PCT/JP2020/022739 dated Sep. 8, 2020.
Written Opinion of the International Searching Authority for PCT/JP2020/022739 dated Sep. 8, 2020.
Extended European Search Report for corresponding European Application No. 20833691.7, dated Jun. 7, 2022.

* cited by examiner

| OPERATING STATE (AIR CONDITIONER) | TEMPERATURE INFORMATION (TARGET SPACE) | HEATING CAPACITY INFORMATION (OUTDOOR AIR HANDLER) |
|---|---|---|
| + (COOLING ACTION) | + (EXCESSIVE HEATING STATE) | + (EXCESSIVE) |
| + | O (APPROPRIATE HEATING STATE) | + |
| + | − (DEFICIENT HEATING STATE) | − (DEFICIENT) |
| − (SUSPENDING ACTION) | + | + |
| − | O | O (APPROPRIATE) |
| − | − | − |

FIG.5

| STATE BEFORE CONTROL ||| TO-BE-SUPPLIED AIR TEMPERATURE / TO-BE-SUPPLIED AIR FLOW RATE | (EXPECTED) STATE AFTER CONTROL |||
|---|---|---|---|---|---|---|
| DEHUMIDIFICATION INFORMATION | HEATING CAPACITY INFORMATION (OUTDOOR AIR HANDLER) | HUMIDITY INFORMATION (TARGET SPACE) |  | DEHUMIDIFICATION INFORMATION | HEATING CAPACITY INFORMATION (OUTDOOR AIR HANDLER) | HUMIDITY INFORMATION (TARGET SPACE) |
| + (CONDENSED WATER PRESENT) | + (EXCESSIVE) | + (EXCESSIVE HUMIDIFICATION STATE) | − (DECREASE) | o (CONDENSED WATER ABSENT) | o (APPROPRIATE) | o (APPROPRIATE HUMIDIFICATION STATE) |
| + | + | o (APPROPRIATE HUMIDIFICATION STATE) | − | o | o | − (DEFICIENT HUMIDIFICATION STATE) |
| + | + | − (DEFICIENT HUMIDIFICATION STATE) | − | o | o | − |
| o (CONDENSED WATER ABSENT) | + | + | − | o | o | o |
| o | + | o | o (MAINTAIN) | o | + (EXCESSIVE) | o |
| o | + | − | − | o | + | − |
| + | o (APPROPRIATE) | + | − | o | o | o |
| + | o | o | o | + (CONDENSED WATER PRESENT) | o | o |
| + | o | − | o | + | o | − |
| o | o | + | − | o | o | o |
| o | o | o | o | + | o | + (EXCESSIVE HUMIDIFICATION STATE) |
| o | o | − | o | + | o | o |
| + | − (DEFICIENT) | + | + (INCREASE) | o | o | − |
| + | − | o | o | + | o | o |
| + | − | − | o | + | − | o |
| o | − | + | o | o | − | + |
| o | − | o | o | o | − | o |
| o | − | − | + | + | o | o |

AIR CONDITIONING SYSTEM

CROSS REFERENCE TO RELATED APPLICATIONS

This application is a Continuation of PCT International Application No. PCT/JP2020/022739, filed on Jun. 9, 2020, which claims priority under 35 U.S.C. 119(a) to Patent Application No. 2019-118856, filed in Japan on Jun. 26, 2019, all of which are hereby expressly incorporated by reference into the present application.

TECHNICAL FIELD

The present disclosure relates to an air conditioning system.

BACKGROUND ART

PTL 1 discloses an air conditioning system including an air conditioner and a humidity conditioner. There is a case where the air conditioner performs a cooling operation and the humidity conditioner performs a humidifying operation in this air conditioning system. In such a case, even though a humidification apparatus is humidifying indoor air, moisture in air may condense in the air conditioner and may be discharged as drain water to outside a room. To suppress an amount of water to be discharged to outside the room in such a case, the air conditioning system of PTL 1 sets an evaporation temperature of refrigerant that cools the air in the air conditioner to be higher than or equal to a dew-point temperature calculated on the basis of a target temperature and a target humidity of the indoor air.

CITATION LIST

Patent Literature

PTL 1: Japanese Unexamined Patent Application Publication No. 2006-329471

SUMMARY

A first aspect of the present disclosure is directed to an air conditioning system including an outdoor air handler (10) configured to treat taken-in outdoor air and supply the treated air to a target space (SP1) and an air conditioner (20) configured to treat indoor air taken in from the target space (SP1) and supply the treated air to the target space (SP1). The air conditioning system is characterized by including a control device (30) configured to, when the outdoor air handler (10) performs a heating humidifying operation for heating and humidifying the outdoor air and the air conditioner (20) performs a cooling operation for cooling the indoor air, adjust at least one of a to-be-supplied air temperature that is a temperature of the treated outdoor air to be supplied to the target space (SP1) by the outdoor air handler (10), a to-be-supplied air flow rate that is a flow rate of the outdoor air to be supplied to the target space (SP1) by the outdoor air handler (10), a to-be-supplied water flow rate that is a flow rate of water for humidification to be supplied to the outdoor air handler (10), and a cooling temperature that is a temperature at an air heat exchanger (22a) included in the air conditioner (20) and configured to cool the indoor air during the cooling operation, based on dehumidification information regarding an amount of condensed water generated in the air conditioner (20), operation information regarding an operating state of the air conditioner (20), temperature information regarding a relationship between an air temperature in the target space (SP1) and a set temperature, and humidity information regarding a relationship between a humidity in the target space (SP1) and a set humidity.

BRIEF DESCRIPTION OF DRAWINGS

FIG. 5 is a table illustrating an operation of an air supply adjustment unit of the control device.

DESCRIPTION OF EMBODIMENTS

An embodiment of the present disclosure will be described with reference to the drawings.

—Configuration of Air Conditioning System—

Figure 1:
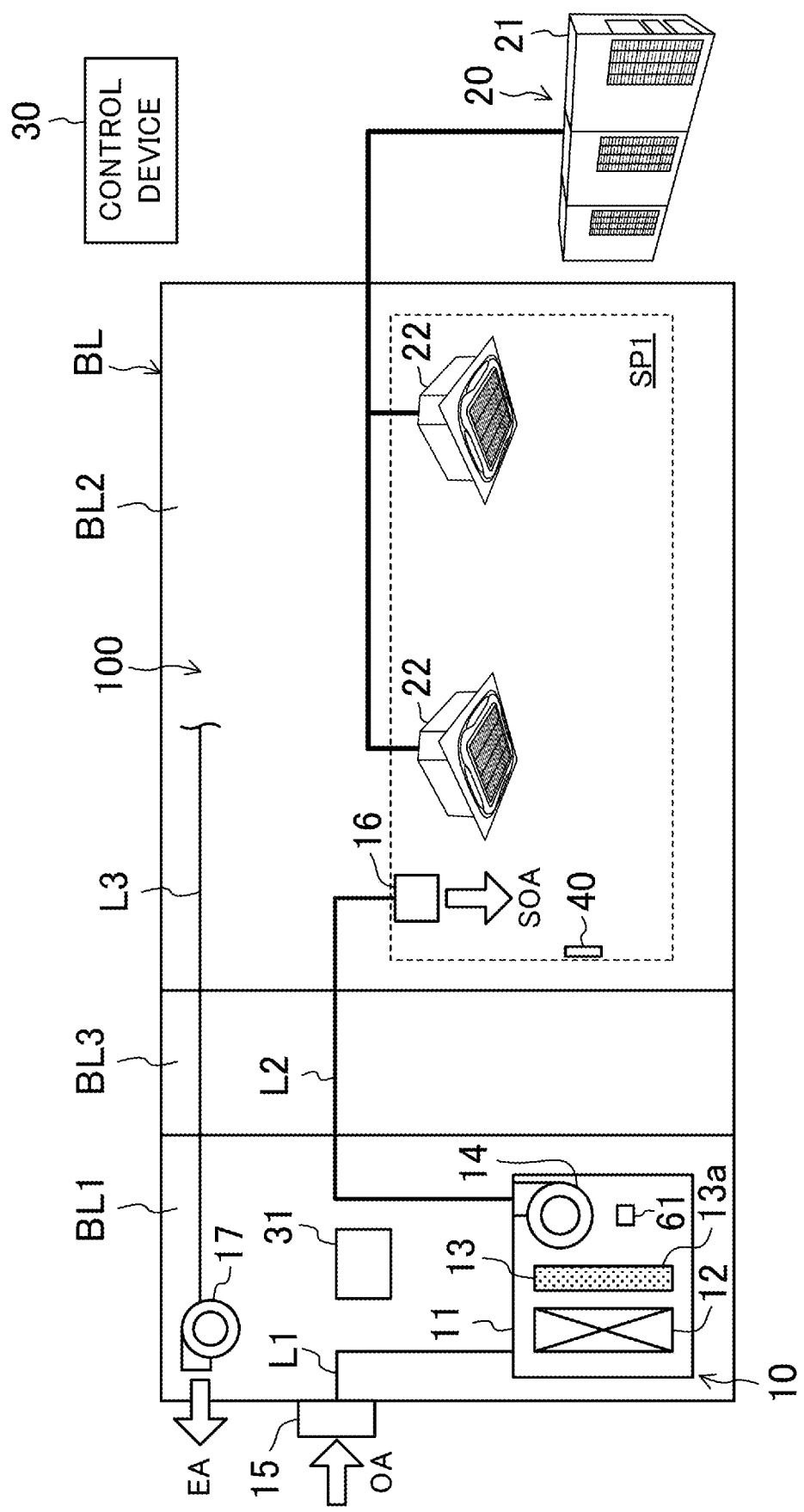
FIG. 1 is a diagram illustrating a schematic configuration of an air conditioning system according to an embodiment.

As illustrated in FIG. 1, an air conditioning system (100) is a system that performs air conditioning in a target space included in a structure such as a house, a building, a factory, or a public facility.

The air conditioning system (100) according to the present embodiment is employed in a building (BL) including a target space (SP1). The building (BL) includes a machine chamber (BL1) in which an outdoor air handler (10) described later is disposed, an exclusively used section (BL2) where the target space (SP1) is present, and a hallway (BL3) located between the machine chamber (BL1) and the exclusively used section (BL2).

As illustrated in FIG. 1, the air conditioning system (100) includes the outdoor air handler (10), an air conditioner (20), and a control device (30). The outdoor air handler (10) adjusts a temperature and a humidity of taken-in outdoor air (OA) and supplies the air to the target space (SP1). The outdoor air (OA) is air outside the target space (SP1) (in this example, air outside the building (BL)). The air conditioner (20) adjusts a temperature of air (indoor air) in the target space (SP1).

In the air conditioning system (100), in response to input of an appropriate command to a remote control (40) installed in the target space (SP1), operating states of the outdoor air handler (10) and the air conditioner (20) can be switched. The control device (30) controls the operating states of the outdoor air handler (10) and the air conditioner (20) in accordance with a command input to the remote control (40), the temperature and the humidity of the outdoor air (OA), and the temperature and the humidity of the indoor air, etc.

—Configuration of Outdoor Air Handler—

The outdoor air handler (10) mainly includes a main unit (11), and a chiller unit (not illustrated) that serves as a heat source unit. The main unit (11) is a so-called air handling unit. The main unit (11) according to the present embodiment is configured to allow a heat medium supplied from the chiller unit not illustrated to exchange heat with air. Note that the main unit (11) according to the present embodiment may be configured to allow refrigerant that circulates between the main unit (11) and the heat source unit not illustrated to exchange heat with air.

While operating, the outdoor air handler (10) takes the outdoor air (OA) from an air intake port (15) provided on an outer wall of the building (BL) into the main unit (11) through an air intake duct (L1). The outdoor air handler (10) adjusts a temperature and a humidity of the taken-in outdoor air (OA), and supplies, as to-be-supplied air (SOA), the treated outdoor air (OA) to the target space (SP1) from an air supply port (16) through an air supply duct (L2).

By using an air discharge fan (17), the outdoor air handler (10) takes in the indoor air from an air discharge port (not illustrated) of the target space (SP1) and releases, as to-be-discharged air (EA), the taken-in indoor air to outside the building (BL) through an air discharge duct (L3).

<Main Unit>

The main unit (11) includes an outdoor air heat exchanger (12), a humidifier (13), and an air supply fan (14).

The outdoor air heat exchanger (12) includes a heat transfer tube and a heat transfer fin. In the outdoor air heat exchanger (12), heat is exchanged between the outdoor air (OA) that passes around the heat transfer tube and the heat transfer fin and a heat medium that passes through the heat transfer tube.

The humidifier (13) humidifies the outdoor air (OA) that has passed through the outdoor air heat exchanger (12). This humidifier (13) is a humidifier of so-called naturally evaporating type (evaporative type). The humidifier (13) includes a humidifying element (13a) and a water supplier. An illustration of the water supplier is omitted. The humidifying element (13a) is constituted by a nonwoven fabric or to be porous so as to retain water (liquid). The water supplier supplies water (liquid) to the humidifying element (13a). The humidifier (13) allows the outdoor air (OA) to be in contact with the humidifying element (13a) and adds water (water vapor) having evaporated from the humidifying element (13a) to the outdoor air (OA).

An amount of moisture (amount of humidification) added to the outdoor air (OA) by the humidifier (13) varies in accordance with the temperature of the outdoor air (OA) supplied from the outdoor air heat exchanger (12) to the humidifier (13). When comparison is made between the cases where the absolute humidity of the outdoor air (OA) that flows into the main unit (11) is the same, the amount of humidification of the humidifier (13) increases as the temperature of the outdoor air (OA) supplied from the outdoor air heat exchanger (12) to the humidifier (13) increases.

The amount of moisture (amount of humidification) added to the outdoor air (OA) by the humidifier (13) varies also in accordance with a flow rate of the outdoor air (OA) that passes through the humidifier (13). When comparison is made between the cases where the absolute humidity of the outdoor air (OA) that flows into the main unit (11) is the same, the amount of humidification of the humidifier (13) increases as the flow rate of the outdoor air (OA) that passes through the humidifier (13) increases. Note that the flow rate of the outdoor air (OA) that passes through the humidifier (13) is substantially equal to a flow rate (to-be-supplied air flow rate) of the to-be-supplied air (SOA) to be supplied from the outdoor air handler (10) to the target space (SP1).

The amount of moisture (amount of humidification) added to the outdoor air (OA) by the humidifier (13) varies also in accordance with a flow rate (to-be-supplied water flow rate) of water for humidification to be supplied from outside the outdoor air handler (10) to the humidifier (13). When comparison is made between the cases where the absolute humidity of the outdoor air (OA) that flows into the main unit (11) is the same, the amount of humidification of the humidifier (13) increases as the to-be-supplied water flow rate increases. Note that the to-be-supplied water flow rate may be adjusted by, for example, adjusting an opening degree of an adjustment valve provided at a pipe for supplying water to the humidifier (13). In the case where the humidifier (13) includes a plurality of humidifying elements (13a), the to-be-supplied water flow rate may be changed by changing the number of humidifying elements (13a) to be used.

The air supply fan (14) is a fan that takes the outdoor air (OA) into the main unit (11) and sends the outdoor air (OA) to the air supply duct (L2). The type of the air supply fan (14) is not limited. For example, a sirocco fan may be used. A rotational speed of the air supply fan (14) is variable. In response to a change in the rotational speed of the air supply fan (14), a flow rate (blow-out flow rate) of air blown out by the air supply fan (14) changes.

The main unit (11) is equipped with a to-be-supplied air temperature sensor (61). The to-be-supplied air temperature sensor (61) is disposed between the humidifier (13) and the air supply fan (14) in an air channel in the main unit (11). The to-be-supplied air temperature sensor (61) measures a temperature of the treated outdoor air (OA) that has passed through the outdoor air heat exchanger (12) and the humidifier (13). A measured value obtained by the to-be-supplied air temperature sensor (61) is a temperature (to-be-supplied air temperature) of the to-be-supplied air (SOA) to be supplied to the target space by the outdoor air handler (10).

<Air Supply Duct and Air Intake Port>

The air supply duct (L2) is a member that forms a channel for the outdoor air (OA). One end of the air supply duct (L2) is connected to the main unit (11). The one end of the air supply duct (L2) communicates with a blow-out port of the air supply fan (14). Another end of the air supply duct (L2) is connected to the air supply port (16).

The air supply port (16) is installed at the ceiling of the target space (SP1). The to-be-supplied air (SOA) sent from the air supply duct (L2) is blown out from this air supply port (16) to the target space (SP1).

<Outdoor-Air-Handler Control Unit>

The outdoor air handler (10) includes an outdoor-air-handler control unit (31). The outdoor-air-handler control unit (31) controls constituent devices provided in the outdoor air handler (10).

Although an illustration is omitted, the outdoor-air-handler control unit (31) includes an arithmetic processing unit and a memory unit. The arithmetic processing unit is, for example, a microprocessor constituted by an integrated circuit. The arithmetic processing unit executes a predetermined program to control the constituent devices of the outdoor air handler (10). The memory unit is, for example, a semiconductor memory constituted by an integrated circuit. The memory unit stores the program for causing the outdoor-air-handler control unit (31) to perform a predetermined operation, and data necessary for the operation of the outdoor-air-handler control unit (31).

—Operations of Outdoor Air Handler—

The outdoor air handler (10) selectively performs a cooling operation and a heating humidifying operation.

<Cooling Operation>

In the cooling operation, a heat medium for cooling (for example, cold water of about 5° C.) is supplied to the outdoor air heat exchanger (12), whereas no water is supplied to the humidifying element (13a) of the humidifier (13). In the cooling operation, the outdoor air (OA) taken into the main unit (11) is cooled when passing through the outdoor air heat exchanger (12) and then passes through the humidifier (13). The humidifier (13) does not humidify the outdoor air (OA). The treated outdoor air (OA) that has passed sequentially through the outdoor air heat exchanger (12) and the humidifier (13) is sucked to the air supply fan (14), flows through the air supply duct (L2) as the to-be-supplied air (SOA), and is blown out to the target space (SP1).

<Heating Humidifying Operation>

In the heating humidifying operation, a heating medium for heating (for example, warm water of about 50° C.) is supplied to the outdoor air heat exchanger (12), and water is supplied to the humidifying element (13a) of the humidifier (13). The outdoor air (OA) taken into the main unit (11) is heated when passing through the outdoor air heat exchanger (12) and then passes through the humidifier (13). The water retained by the humidifying element (13a) evaporates and is added to the outdoor air (OA) in the humidifier (13). The treated outdoor air (OA) that has passed sequentially through the outdoor air heat exchanger (12) and the humidifier (13) is sucked to the air supply fan (14), flows through the air supply duct (L2) as the to-be-supplied air (SOA), and is blown out to the target space (SP1).

<Control Operation of Outdoor-Air-Handler Control Unit>

The outdoor-air-handler control unit (31) controls the operation of the outdoor air handler (10) such that a to-be-supplied air temperature Ts is in a predetermined set to-be-supplied air temperature range. The to-be-supplied air temperature Ts is a measured value obtained by the to-be-supplied air temperature sensor (61). The set to-be-supplied temperature range is a temperature range including a set to-be-supplied air temperature Ts_set that is set for the temperature of the to-be-supplied air (SOA). The set to-be-supplied air temperature range of the present embodiment is a range of Ts_set±1° C.

The outdoor-air-handler control unit (31) adjusts the temperature or the flow rate of the heat medium to be supplied to the outdoor air heat exchanger (12) such that a relationship of Ts_set−1° C.≤Ts≤Ts_set+1° C. is satisfied. If the set to-be-supplied air temperature Ts_set is lower than a lower-limit value (Ts_set−1° C.) of the set to-be-supplied air temperature range (Ts<Ts_set−1° C.), the outdoor-air-handler control unit (31) increases the temperature of the heat medium to be supplied to the outdoor air heat exchanger (12) or increases the flow rate of the heat medium. If the set to-be-supplied air temperature Ts_set is lower than an upper-limit value (Ts_set+1° C.) of the set to-be-supplied air temperature range (Ts_set+1° C.<Ts), the outdoor-air-handler control unit (31) decreases the temperature of the heat medium to be supplied to the outdoor air heat exchanger (12) or decreases the flow rate of the heat medium.

—Configuration of Air Conditioner—

The air conditioner (20) includes a refrigerant circuit (20a) and causes refrigerant to circulate through the refrigerant circuit (20a) to perform a vapor compression refrigeration cycle.

Figure 2:
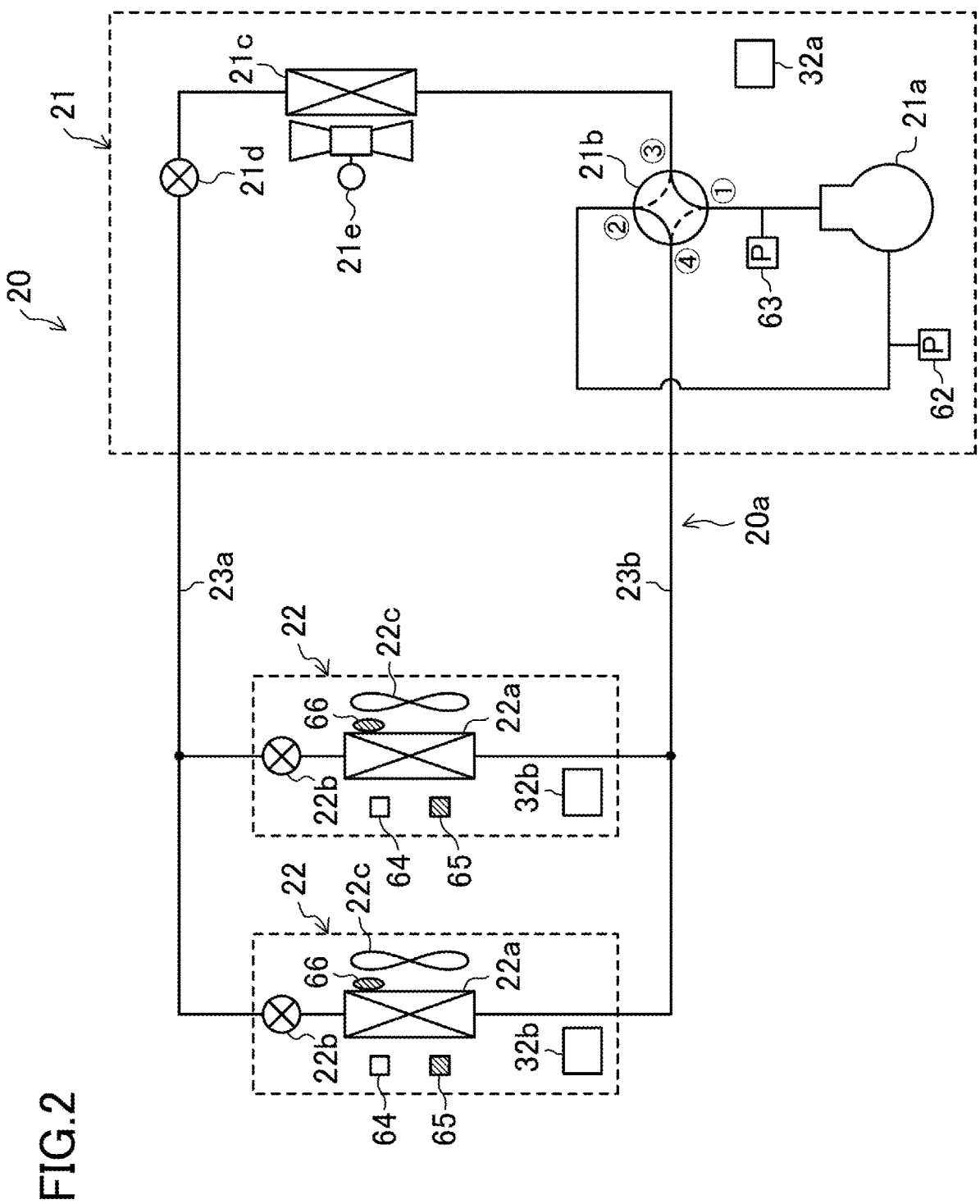
FIG. 2 is a refrigerant circuit diagram illustrating a configuration of an air conditioner according to the embodiment.

As illustrated in FIG. 2, the air conditioner (20) includes one outdoor unit (21) that serves as a heat source unit, and a plurality of (two in the present embodiment) indoor units (22). In the air conditioner (20), the outdoor unit (21) and each of the indoor units (22) are connected to each other through a pair of connection pipes (23a, 23b) to form the refrigerant circuit (20a). In the refrigerant circuit (20a), the plurality of indoor units (22) are disposed in parallel with each other. The refrigerant sealed in the refrigerant circuit (20a) is not limited. For example, the refrigerant may be HFC refrigerant such as R32 or R410A.

<Outdoor Unit>

The outdoor unit (21) is disposed outside the target space (SP1) (in this example, outside the building (BL)). The outdoor unit (21) includes a compressor (21a), a four-way switching valve (21b), an outdoor heat exchanger (21c), an outdoor expansion valve (21d), an outdoor fan (21e), and an outdoor-unit control unit (32a).

The compressor (21a) has a discharge pipe connected to a first port of the four-way switching valve (21b) and a suction pipe connected to a second port of the four-way switching valve (21b). A third port of the four-way switching valve (21b) is connected to a gas-side end of the outdoor heat exchanger (21c). A liquid-side end of the outdoor heat exchanger (21c) is connected to one end of the outdoor expansion valve (21d). Another end of the outdoor expansion valve (21d) is connected to a liquid-side connection pipe (23a). A fourth port of the four-way switching valve (21b) is connected to a gas-side connection pipe (23b).

The compressor (21a) is a hermetic compressor. An operating capacity of this compressor (21a) is variable. Specifically, alternating current is supplied to an electric motor of the compressor (21a) from an inverter not illustrated. In response to a change in frequency of the alternating current supplied to the compressor (21a) by the inverter (the operating frequency of the compressor (21a)), the rotational speed of the compressor (21a) changes. As a result, the operating capacity of the compressor (21a) changes.

The four-way switching valve (21b) is a switching valve for switching between a first state (state indicated by solid lines in FIG. 2) and a second state (state indicated by broken lines in FIG. 2). In the four-way switching valve (21b) in the first state, the first port communicates with the third port and the second port communicates with the fourth port. In the four-way switching valve (21b) in the second state, the first port communicates with the fourth port and the second port communicates with the third port.

The outdoor heat exchanger (21c) is a so-called fin-and-tube heat exchanger. This outdoor heat exchanger (21c) allows refrigerant flowing through the refrigerant circuit (20a) to exchange heat with outdoor air supplied by the outdoor fan (21e). The outdoor expansion valve (21d) is an electronic expansion valve with a variable opening degree.

The outdoor-unit control unit (32a) controls constituent devices provided in the outdoor unit (21). Although an illustration is omitted, the outdoor-unit control unit (32a) includes an arithmetic processing unit and a memory unit. The arithmetic processing unit is, for example, a microprocessor constituted by an integrated circuit. The arithmetic processing unit executes a predetermined program to control the constituent devices of the outdoor unit (21). The memory unit is, for example, a semiconductor memory constituted by an integrated circuit. The memory unit stores the program for causing the outdoor-unit control unit (32a) to perform a predetermined operation, and data necessary for the operation of the outdoor-unit control unit (32a).

The outdoor unit (21) is equipped with a suction pressure sensor (62) and a discharge pressure sensor (63). The suction pressure sensor (62) is connected to a pipe that joins the suction pipe of the compressor (21a) and the second port of the four-way switching valve (21b) to each other and measures a pressure of the refrigerant to be sucked to the compressor (21a). The discharge pressure sensor (63) is connected to a pipe that joins the discharge pipe of the compressor (21a) and the first port of the four-way switching valve (21b) to each other and measures a pressure of the refrigerant discharged from the compressor (21a).

<Indoor Unit>

The indoor units (22) are disposed in the target space (SP1). Each of the indoor units (22) includes an indoor heat exchanger (22a) that is an air heat exchanger, an indoor expansion valve (22b), an indoor fan (22c), and an indoor-unit control unit (32b).

In each of the indoor units (22), the indoor heat exchanger (22a) and the indoor expansion valve (22b) are disposed in series with each other. Each of the indoor units (22) has one end, on the indoor heat exchanger (22a) side, connected to the gas-side connection pipe (23b), and another end, on the indoor expansion valve (22b) side, connected to the liquid-side connection pipe (23a).

The indoor heat exchanger (22a) is a so-called fin-and-tube heat exchanger. This indoor heat exchanger (22a) allows refrigerant flowing through the refrigerant circuit (20a) to exchange heat with indoor air supplied by the indoor fan (22c). The indoor expansion valve (22b) is an electronic expansion valve with a variable opening degree.

The indoor-unit control unit (32b) controls constituent devices provided in the indoor unit (22). Although an illustration is omitted, the indoor-unit control unit (32b) includes an arithmetic processing unit and a memory unit. The arithmetic processing unit is, for example, a microprocessor constituted by an integrated circuit. The arithmetic processing unit executes a predetermined program to control the constituent devices of the indoor unit (22). The memory unit is, for example, a semiconductor memory constituted by an integrated circuit. The memory unit stores the program for causing the indoor-unit control unit (32b) to perform a predetermined operation, and data necessary for the operation of the indoor-unit control unit (32b).

The indoor heat exchanger (22a) is equipped with a refrigerant temperature sensor (66). The refrigerant temperature sensor (66) is attached to a heat transfer tube of the indoor heat exchanger (22a) and measures a temperature of the refrigerant flowing through the indoor heat exchanger (22a). In the case where the indoor heat exchanger (22a) functions as an evaporator, a measured value obtained by the refrigerant temperature sensor (66) substantially indicates an evaporation temperature of the refrigerant.

Each of the indoor units (22) is equipped with an indoor temperature sensor (64) and an indoor humidity sensor (65). The indoor temperature sensor (64) measures the temperature of the indoor air sucked by the indoor unit (22) upstream of the indoor heat exchanger (22a). The indoor humidity sensor (65) measures a relative humidity of the indoor air sucked by the indoor unit (22) upstream of the indoor heat exchanger (22a).

—Operations of Air Conditioner—

The air conditioner (20) performs a cooling operation and a heating operation.

<Cooling Operation>

In the cooling operation, the four-way switching valve (21b) is set in the first state, the outdoor expansion valve (21d) is held to be fully open, and the opening degrees of the indoor expansion valves (22b) are individually adjusted. In the refrigerant circuit (20a), a refrigeration cycle is performed, so that the outdoor heat exchanger (21c) functions as a condenser and the indoor heat exchangers (22a) function as evaporators.

Specifically, the refrigerant discharged from the compressor (21a) dissipates heat and condenses in the outdoor heat exchanger (21c) and is then distributed to the plurality of indoor units (22) through the liquid-side connection pipe (23a). In each of the indoor units (22), the refrigerant that has flowed in expands when passing through the indoor expansion valve (22b) and then absorbs heat to evaporate in the indoor heat exchanger (22a). The refrigerant that has flowed out from each of the indoor units (22) flows into the outdoor unit (21) through the gas-side connection pipe (23b) and is sucked to the compressor (21a). The compressor (21a) compresses the sucked refrigerant and discharges the compressed refrigerant.

The indoor air sucked into the indoor unit (22) from the target space (SP1) is cooled when passing through the indoor heat exchanger (22a) and is then blown out to the target space (SP1). When a surface temperature of the indoor heat exchanger (22a) is lower than a dew-point temperature of the indoor air, water vapor contained in the indoor air condenses and condensed water is generated on the surface of the indoor heat exchanger (22a). The condensed water generated at the indoor heat exchanger (22a) is discharged as drain water from the indoor unit (22) to the outdoors.

<Heating Operation>

In the heating operation, the four-way switching valve (21b) is set in the second state, and the opening degrees of the outdoor expansion valve (21d) and the indoor expansion valves (22b) are individually adjusted. In the refrigerant circuit (20a), a refrigeration cycle is performed, so that the indoor heat exchangers (22a) function as condensers and the outdoor heat exchanger (21c) functions as an evaporator.

Specifically, the refrigerant discharged from the compressor (21a) is distributed to the plurality of indoor units (22) through the gas-side connection pipe (23b). In each of the indoor units (22), the refrigerant that has flowed in dissipates heat and condenses at the indoor heat exchanger (22a) and then passes through the indoor expansion valve (22b). The refrigerant that has flowed out from each of the indoor units (22) flows into the outdoor unit (21) through the liquid-side connection pipe (23a) and expands when passing through the outdoor expansion valve (21d). Then, the refrigerant absorbs heat and evaporates at the outdoor heat exchanger (21c) and is sucked to the compressor (21a). The compressor (21a) compresses the sucked refrigerant and discharges the compressed refrigerant.

The indoor air sucked into the indoor unit (22) from the target space (SP1) is heated when passing through the indoor heat exchanger (22a) and is then blown out to the target space (SP1).

<Operation of Outdoor-Unit Control Unit>

The outdoor-unit control unit (32a) adjusts an operating capacity of the compressor (21a). An operation performed by the outdoor-unit control unit (32a) to adjust the operating capacity of the compressor (21a) during the cooling operation will now be described.

In the cooling operation, the outdoor-unit control unit (32a) adjusts an operating frequency of the compressor (21a) such that a low pressure of the refrigeration cycle is in a target pressure range including a predetermined target low pressure LP_tg. The target pressure range of the present embodiment is a range of $LP\_tg \pm \Delta P$. In addition, the target low pressure LP_tg is a saturation pressure corresponding to a target evaporation temperature Te_tg. The target evaporation temperature Te_tg is a target value of the evaporation temperature of the refrigerant in the indoor heat exchanger (22a) during the cooling operation.

The outdoor-unit control unit (32a) adjusts the operating capacity of the compressor (21a) such that a relationship of $LP\_tg - \Delta P \leq LP \leq LP\_tg + \Delta P$ is satisfied. LP denotes a measured value obtained by the suction pressure sensor (62).

If the measured value LP is lower than a lower-limit value (LP_tg−ΔP) of the target pressure range (LP<LP_tg−ΔP), the outdoor-unit control unit (32a) decreases the operating frequency of the compressor (21a) to decrease the operating capacity of the compressor (21a). On the other hand, if the measured value LP is higher than an upper-limit value (LP_tg+ΔP) of the target pressure range (LP_tg+ΔP<LP), the outdoor-unit control unit (32a) increases the operating frequency of the compressor (21a) to increase the operating capacity of the compressor (21a).

<Operation 1 of Indoor-Unit Control Unit>

The indoor-unit control unit (32b) switches the operating state of the indoor unit (22) in each of the cooling operation and the heating operation. For example, in the cooling operation of the air conditioner (20), the operating state of the indoor unit (22) is switched between a cooling action and a suspending action. Switching between the cooling action and the suspending action performed by the indoor-unit control unit (32b) will now be described.

In each of the indoor units (22), the indoor-unit control unit (32b) switches between the cooling action and the suspending action such that a measured value Tr obtained by the indoor temperature sensor (64) is in an indoor temperature range including a set indoor temperature Tr_set. The set indoor temperature Tr_set is input to the indoor-unit control unit (32b) as a result of a person in the room operating the remote control (40). The indoor temperature range is a range of Tr_set±ΔTr. In addition, the indoor-unit control unit (32b) outputs, to the control device (30), a signal indicating which of the cooling action and the suspending action the corresponding indoor unit (22) is performing.

When the measured value Tr obtained by the indoor temperature sensor (64) exceeds an upper-limit value (Tr_set+ΔTr) of the indoor temperature range (Tr_set+ΔTr<Tr), the indoor-unit control unit (32b) causes the indoor unit (22) to perform the cooling action. Specifically, the indoor-unit control unit (32b) causes the indoor fan (22c) to operate and adjusts the opening degree of the indoor expansion valve (22b) such that the indoor air is cooled at the indoor heat exchanger (22a).

On the other hand, when the measured value Tr obtained by the indoor temperature sensor (64) is below a lower-limit value (Tr_set−ΔTr) of the indoor temperature range (Tr<Tr_set−ΔTr), the indoor-unit control unit (32b) causes the indoor unit (22) to perform the suspending action. Specifically, the indoor-unit control unit (32b) maintains the opening degree of the indoor expansion valve (22b) to be fully closed or slightly open such that the indoor air is not cooled at the indoor heat exchanger (22a). The indoor-unit control unit (32b) also causes the indoor fan (22c) to operate.

<Operation 2 of Indoor-Unit Control Unit>

During the cooling operation of the indoor unit (22), the indoor-unit control unit (32b) determines whether condensed water is generated at the indoor heat exchanger (22a) and outputs the determined result to the control device (30).

In each of the indoor units (22), the indoor-unit control unit (32b) calculates a dew-point temperature Tr_dp of the indoor air by using the measured values obtained by the indoor temperature sensor (64) and the indoor humidity sensor (65). The indoor-unit control unit (32b) then determines whether condensed water is generated at the indoor heat exchanger (22a) on the basis of the calculated dew-point temperature Tr_dp and a measured value Te obtained by the refrigerant temperature sensor (66).

During the cooling operation of the indoor unit (22), the indoor heat exchanger (22a) functions as an evaporator and the measured value Te obtained by the refrigerant temperature sensor (66) substantially indicates an evaporation temperature of the refrigerant. A surface temperature Tsf of the fin of the indoor heat exchanger (22a) indicates a value (Tsf=Te+ΔT) that is greater than the measured value Te obtained by the refrigerant temperature sensor (66) by a predetermined value. The surface temperature Tsf of the fin of the indoor heat exchanger (22a) is a temperature (that is, a cooling temperature) at an air heat exchanger configured to cool the indoor air during the cooling operation.

The indoor-unit control unit (32b) compares the dew-point temperature Tr_dp of the indoor air with the surface temperature Tsf of the fin of the indoor heat exchanger (22a). If the surface temperature Tsf of the fin of the indoor heat exchanger (22a) is lower than or equal to the dew-point temperature Tr_dp of the indoor air (Tsf≤Tr_dp), the indoor-unit control unit (32b) determines that condensed water is generated at the indoor heat exchanger (22a). On the other hand, if the surface temperature Tsf of the fin of the indoor heat exchanger (22a) is higher than the dew-point temperature Tr_dp of the indoor air (Tr_dp<Tsf), the indoor-unit control unit (32b) determines that no condensed water is generated at the indoor heat exchanger (22a).

—Control Device—

The control device (30) comprehensively controls an operation of the air conditioning system (100). Although an illustration is omitted, the control device (30) includes an arithmetic processing unit and a memory unit. The arithmetic processing unit is, for example, a microprocessor constituted by an integrated circuit. The arithmetic processing unit executes a predetermined program to perform a predetermined control operation. The memory unit is, for example, a semiconductor memory constituted by an integrated circuit. The memory unit stores the program for causing the control device (30) to perform a predetermined operation, and data necessary for the operation of the control device (30).

The control device (30) is electrically connected to the outdoor-air-handler control unit (31), the outdoor-unit control unit (32a), and all the indoor-unit control units (32b). The control device (30) is configured to able to communicate with the outdoor-air-handler control unit (31), the outdoor-unit control unit (32a), and the indoor-unit control units (32b), and transmits and receives signals to and from these control units (31, 32a, 32b).

Figures 3, 4:
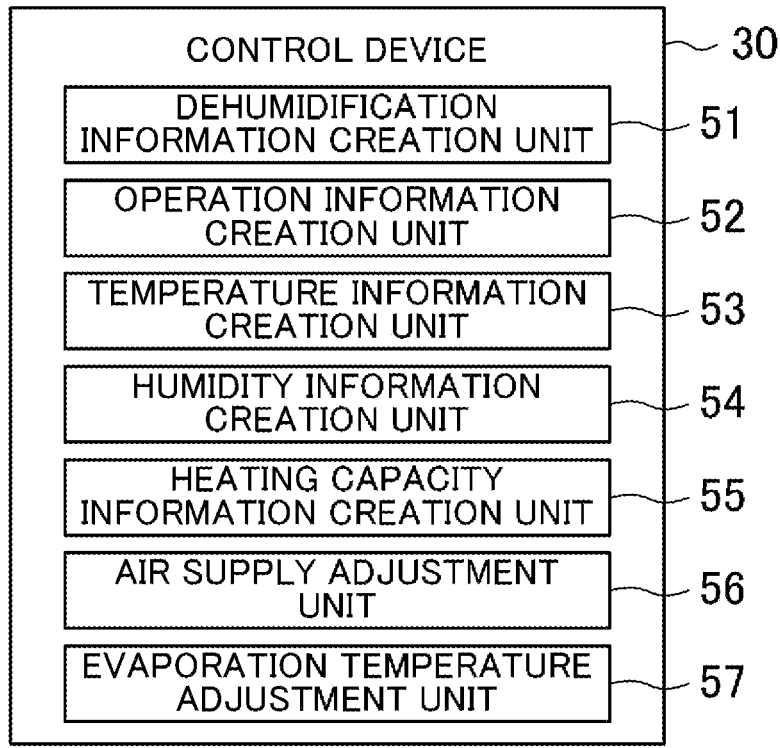
FIG. 3 is a block diagram illustrating a configuration of a control device according to the embodiment.
FIG. 4 is a table illustrating an operation of a heating capacity information creation unit of the control device.

As illustrated in FIG. 3, the control device (30) includes a dehumidification information creation unit (51), an operation information creation unit (52), a temperature information creation unit (53), a humidity information creation unit (54), a heating capacity information creation unit (55), an air supply adjustment unit (56), and an evaporation temperature adjustment unit (57). These creation units (51 to 55) and adjustment units (56, 57) are implemented as a result of the arithmetic processing unit executing a predetermined program. In addition, these creation units (51 to 55) and adjustment units (56, 57) perform predetermined operations described below when the air conditioner (20) performs the cooling operation and the outdoor air handler (10) performs the heating humidifying operation.

<Dehumidification Information Generation Unit>

The dehumidification information creation unit (51) creates dehumidification information regarding an amount of condensed water generated in the indoor unit (22) of the air conditioner (20).

During the cooling operation of the air conditioner (20), the dehumidification information creation unit (51) receives a signal indicating whether condensed water is generated at the indoor heat exchanger (22a) from the indoor-unit control unit (32b) of each of the indoor units (22). In response to receipt of a signal indicating that condensed water is generated at the indoor heat exchanger (22a) from at least one indoor-unit control unit (32b), the dehumidification information creation unit (51) creates dehumidification information indicating that condensed water is generated in the air conditioner (20). On the other hand, in response to receipt of a signal indicating that no condensed water is generated at the indoor heat exchanger (22a) from all the indoor-unit control units (32b), the dehumidification information creation unit (51) creates dehumidification information indicating that no condensed water is generated in the air conditioner (20).

<Operation Information Creation Unit>

The operation information creation unit (52) creates operation information regarding the operating state of the air conditioner (20).

During the cooling operation of the air conditioner (20), the operation information creation unit (52) receives, from the indoor-unit control unit (32b) of each of the indoor units (22), a signal indicating which of the cooling action and the suspending action the indoor unit (22) is performing. In response to receipt of a signal indicating that the corresponding indoor unit (22) is performing the cooling action from at least one indoor-unit control unit (32b), the operation information creation unit (52) creates operation information indicating that the air conditioner (20) is performing the cooling action. On the other hand, in response to receipt of a signal indicating that the corresponding indoor unit (22) is performing the suspending action from all the indoor-unit control units (32b), the operation information creation unit (52) creates operation information indicating that the air conditioner (20) is performing the suspending action.

<Temperature Information Creation Unit>

The temperature information creation unit (53) creates temperature information regarding a relationship between an air temperature in the target space (SP1) and a set temperature.

The temperature information creation unit (53) acquires the measured value Tr obtained by the indoor temperature sensor (64) of each indoor unit (22) and the set indoor temperature Tr_set. The temperature information creation unit (53) calculates a mean indoor temperature Tr_m which is an arithmetic mean of the measured value Tr obtained by the indoor temperature sensor (64) of each indoor unit (22) and compares this mean indoor temperature Tr_m with the indoor temperature range $Tr\_set \pm \Delta Tr$ which includes the set indoor temperature Tr_set.

If the mean indoor temperature Tr_m is in the indoor temperature range $Tr\_set \pm \Delta Tr$ ($Tr\_set - \Delta Tr \leq Tr\_m \leq Tr\_set + \Delta Tr$), the temperature information creation unit (53) creates temperature information indicating an appropriate heating state. If the mean indoor temperature Tr_m is higher than the upper-limit value $Tr\_set + \Delta Tr$ of the indoor temperature range ($Tr\_set + \Delta Tr < Tr\_m$), the temperature information creation unit (53) creates temperature information indicating an excessive heating state. If the mean indoor temperature Tr_m is lower than the lower-limit value $Tr\_set - \Delta Tr$ of the indoor temperature range ($Tr\_m < Tr\_set - \Delta Tr$), the temperature information creation unit (53) creates temperature information indicating a deficient heating state.

<Humidity Information Creation Unit>

The humidity information creation unit (54) creates humidity information regarding a relationship between a humidity in the target space (SP1) and a set humidity.

The humidity information creation unit (54) acquires the measured value Tr obtained by the indoor temperature sensor (64) and a measured value RHr obtained by the indoor humidity sensor (65) from each indoor unit (22). The humidity information creation unit (54) calculates the mean indoor temperature Tr_m which is an arithmetic mean of the measured value Tr obtained by the indoor temperature sensor (64) of each indoor unit (22) and calculates a mean indoor humidity RHr_m which is an arithmetic mean of the measured value RHr obtained by the indoor humidity sensor (65) of each indoor unit (22). The humidity information creation unit (54) calculates an absolute humidity Xr of the indoor air by using the mean indoor temperature Tr_m and the mean indoor humidity RHr_m.

The humidity information creation unit (54) also compares the calculated absolute humidity Xr of the indoor air with an indoor humidity range $Xr\_set \pm \Delta Xr$ which includes a set indoor humidity Xr_set. The humidity information creation unit (54) may acquire the set indoor humidity Xr_set from the indoor-unit control unit (32b) of each indoor unit (22) or may read out the set indoor humidity Xr_set from the memory unit of the control device (30).

If the absolute humidity Xr of the indoor air is in the indoor humidity range $Xr\_set \pm \Delta Xr$ ($Xr\_set - \Delta Xr \leq Xr \leq Xr\_set + \Delta Xr$), the humidity information creation unit (54) creates humidity information indicating an appropriate humidification state. If the absolute humidity Xr of the indoor air is higher than an upper-limit value $Xr\_set + \Delta Xr$ of the indoor humidity range ($Xr\_set + \Delta Xr < Xr$), the humidity information creation unit (54) creates humidity information indicating an excessive humidification state. If the absolute humidity Xr of the indoor air is lower than a lower-limit value $Xr\_set - \Delta Xr$ of the indoor humidity range ($Xr\_m < Xr\_set - \Delta Xr$), the humidity information creation unit (54) creates temperature information indicating a deficient humidification state.

<Heating Capacity Information Creation Unit>

The heating capacity information creation unit (55) creates heating capacity information, which indicates whether a heating capacity of the outdoor air handler (10) is appropriate, excessive, or deficient, on the basis of the operation information and the temperature information. An operation of this heating capacity information creation unit (55) will be described with reference to FIG. 4.

The heating capacity information creation unit (55) creates heating capacity information indicating that the heating capacity of the outdoor air handler (10) is excessive in the case where the operation information indicates that the air conditioner (20) is performing the cooling action and the temperature information indicates the excessive heating state.

The heating capacity information creation unit (55) creates heating capacity information indicating that the heating capacity of the outdoor air handler (10) is excessive in the case where the operation information indicates that the air conditioner (20) is performing the cooling action and the temperature information indicates the appropriate heating state.

The heating capacity information creation unit (55) creates heating capacity information indicating that the heating capacity of the outdoor air handler (10) is deficient in the case where the operation information indicates that the air conditioner (20) is performing the cooling action and the temperature information indicates the deficient heating state.

The heating capacity information creation unit (55) creates heating capacity information indicating that the heating capacity of the outdoor air handler (10) is excessive in the case where the operation information indicates that the air conditioner (20) is performing the suspending action and the temperature information indicates the excessive heating state.

The heating capacity information creation unit (55) creates heating capacity information indicating that the heating capacity of the outdoor air handler (10) is appropriate in the case where the operation information indicates that the air conditioner (20) is performing the suspending action and the temperature information indicates the appropriate heating state.

The heating capacity information creation unit (55) creates heating capacity information indicating that the heating capacity of the outdoor air handler (10) is deficient in the case where the operation information indicates that the air conditioner (20) is performing the suspending action and the temperature information indicates the deficient heating state.

<Air Supply Adjustment Unit>

The air supply adjustment unit (56) adjusts the set to-be-supplied air temperature Ts_set on the basis of the dehumidification information, the heating capacity information, and the humidity information.

The air supply adjustment unit (56) selects any one of a to-be-supplied-air-temperature increasing signal, a to-be-supplied-air-temperature maintaining signal, and a to-be-supplied-air-temperature decreasing signal on the basis of the dehumidification information, the heating capacity information, and the humidity information, and transmits the selected signal to the outdoor-air-handler control unit (31). The to-be-supplied-air-temperature increasing signal is a signal for giving an instruction for increasing the set to-be-supplied air temperature Ts_set by a predetermined value (for example, 1° C.). The to-be-supplied-air-temperature maintaining signal is a signal for giving an instruction for not changing the set to-be-supplied air temperature Ts_set. The to-be-supplied-air-temperature decreasing signal is a signal for giving an instruction for decreasing the set to-be-supplied air temperature Ts_set by a predetermined value (for example, 1° C.).

The outdoor-air-handler control unit (31) increases the set to-be-supplied air temperature Ts_set by the predetermined value in response to receiving the to-be-supplied-air-temperature increasing signal, maintains the value of the set to-be-supplied air temperature Ts_set in response to receiving the to-be-supplied-air-temperature maintaining signal, and decreases the set to-be-supplied air temperature Ts_set by the predetermined value in response to receiving the to-be-supplied-air-temperature decreasing signal. The outdoor-air-handler control unit (31) then controls the to-be-supplied air temperature of the outdoor air handler (10) by using the updated set to-be-supplied air temperature Ts_set.

An operation performed by the air supply adjustment unit (56) will be described with reference to FIG. 5.

(1) The air supply adjustment unit (56) transmits the to-be-supplied-air-temperature decreasing signal to the outdoor-air-handler control unit (31) in the case where the dehumidification information indicates that condensed water is generated at the indoor heat exchanger (22a), the heating capacity information indicates that the heating capacity of the outdoor air handler (10) is excessive, and the humidity information indicates the excessive humidification state.

In response to the outdoor-air-handler control unit (31) decreasing the set to-be-supplied air temperature Ts_set, the to-be-supplied air temperature of the outdoor air handler (10) decreases. Also, the amount of humidification of the humidifier (13) decreases, and thus the absolute humidity of the to-be-supplied air (SOA) decreases. As a result, the dehumidification information expectedly changes to information indicating that no condensed water is generated at the indoor heat exchanger (22a). In addition, the heating capacity information expectedly changes to information indicating that the heating capacity of the outdoor air handler (10) is appropriate. Further, the humidity information expectedly changes to the appropriate humidification state.

(2) The air supply adjustment unit (56) transmits the to-be-supplied-air-temperature decreasing signal to the outdoor-air-handler control unit (31) in the case where the dehumidification information indicates that condensed water is generated at the indoor heat exchanger (22a), the heating capacity information indicates that the heating capacity of the outdoor air handler (10) is excessive, and the humidity information indicates the appropriate humidification state.

In response to the outdoor-air-handler control unit (31) decreasing the set to-be-supplied air temperature Ts_set, the to-be-supplied air temperature of the outdoor air handler (10) decreases. Also, the amount of humidification of the humidifier (13) decreases, and thus the absolute humidity of the to-be-supplied air (SOA) decreases. As a result, the dehumidification information expectedly changes to information indicating that no condensed water is generated at the indoor heat exchanger (22a). In addition, the heating capacity information expectedly changes to information indicating that the heating capacity of the outdoor air handler (10) is appropriate. Further, the humidity information expectedly changes to the deficient humidification state.

(3) The air supply adjustment unit (56) transmits the to-be-supplied-air-temperature decreasing signal to the outdoor-air-handler control unit (31) in the case where the dehumidification information indicates that condensed water is generated at the indoor heat exchanger (22a), the heating capacity information indicates that the heating capacity of the outdoor air handler (10) is excessive, and the humidity information indicates the deficient humidification state.

In response to the outdoor-air-handler control unit (31) decreasing the set to-be-supplied air temperature Ts_set, the to-be-supplied air temperature of the outdoor air handler (10) decreases. Also, the amount of humidification of the humidifier (13) decreases, and thus the absolute humidity of the to-be-supplied air (SOA) decreases. As a result, the dehumidification information expectedly changes to information indicating that no condensed water is generated at the indoor heat exchanger (22a). In addition, the heating capacity information expectedly changes to information indicating that the heating capacity of the outdoor air handler (10) is appropriate. Further, the humidity information is expectedly maintained to be the deficient humidification state.

(4) The air supply adjustment unit (56) transmits the to-be-supplied-air-temperature decreasing signal to the outdoor-air-handler control unit (31) in the case where the dehumidification information indicates that no condensed water is generated at the indoor heat exchanger (22a), the heating capacity information indicates that the heating capacity of the outdoor air handler (10) is excessive, and the humidity information indicates the excessive humidification state.

In response to the outdoor-air-handler control unit (31) decreasing the set to-be-supplied air temperature Ts_set, the to-be-supplied air temperature of the outdoor air handler (10) decreases. Also, the amount of humidification of the humidifier (13) decreases, and thus the absolute humidity of the to-be-supplied air (SOA) decreases. As a result, the dehumidification information is expectedly maintained to be the information indicating that no condensed water is generated at the indoor heat exchanger (22a). In addition, the heating capacity information expectedly changes to information indicating that the heating capacity of the outdoor air handler (10) is appropriate. Further, the humidity information expectedly changes to the appropriate humidification state.

(5) The air supply adjustment unit (56) transmits the to-be-supplied-air-temperature maintaining signal to the outdoor-air-handler control unit (31) in the case where the dehumidification information indicates that no condensed water is generated at the indoor heat exchanger (22a), the heating capacity information indicates that the heating capacity of the outdoor air handler (10) is excessive, and the humidity information indicates the appropriate humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(6) The air supply adjustment unit (56) transmits the to-be-supplied-air-temperature maintaining signal to the outdoor-air-handler control unit (31) in the case where the dehumidification information indicates that no condensed water is generated at the indoor heat exchanger (22a), the heating capacity information indicates that the heating capacity of the outdoor air handler (10) is excessive, and the humidity information indicates the deficient humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(7) The air supply adjustment unit (56) transmits the to-be-supplied-air-temperature decreasing signal to the outdoor-air-handler control unit (31) in the case where the dehumidification information indicates that condensed water is generated at the indoor heat exchanger (22a), the heating capacity information indicates that the heating capacity of the outdoor air handler (10) is appropriate, and the humidity information indicates the excessive humidification state.

In response to the outdoor-air-handler control unit (31) decreasing the set to-be-supplied air temperature Ts_set, the to-be-supplied air temperature of the outdoor air handler (10) decreases. Also, the amount of humidification of the humidifier (13) decreases, and thus the absolute humidity of the to-be-supplied air (SOA) decreases. As a result, the dehumidification information expectedly changes to information indicating that no condensed water is generated at the indoor heat exchanger (22a). In addition, the heating capacity information expectedly changes to information indicating that the heating capacity of the outdoor air handler (10) is deficient. Further, the humidity information expectedly changes to the appropriate humidification state.

(8) The air supply adjustment unit (56) transmits the to-be-supplied-air-temperature maintaining signal to the outdoor-air-handler control unit (31) in the case where the dehumidification information indicates that condensed water is generated at the indoor heat exchanger (22a), the heating capacity information indicates that the heating capacity of the outdoor air handler (10) is appropriate, and the humidity information indicates the appropriate humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(9) The air supply adjustment unit (56) transmits the to-be-supplied-air-temperature maintaining signal to the outdoor-air-handler control unit (31) in the case where the dehumidification information indicates that condensed water is generated at the indoor heat exchanger (22a), the heating capacity information indicates that the heating capacity of the outdoor air handler (10) is appropriate, and the humidity information indicates the deficient humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(10) The air supply adjustment unit (56) transmits the to-be-supplied-air-temperature maintaining signal to the outdoor-air-handler control unit (31) in the case where the dehumidification information indicates that no condensed water is generated at the indoor heat exchanger (22a), the heating capacity information indicates that the heating capacity of the outdoor air handler (10) is appropriate, and the humidity information indicates the excessive humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(11) The air supply adjustment unit (56) transmits the to-be-supplied-air-temperature maintaining signal to the outdoor-air-handler control unit (31) in the case where the dehumidification information indicates that no condensed water is generated at the indoor heat exchanger (22a), the heating capacity information indicates that the heating capacity of the outdoor air handler (10) is appropriate, and the humidity information indicates the appropriate humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(12) The air supply adjustment unit (56) transmits the to-be-supplied-air-temperature maintaining signal to the outdoor-air-handler control unit (31) in the case where the dehumidification information indicates that no condensed water is generated at the indoor heat exchanger (22a), the heating capacity information indicates that the heating capacity of the outdoor air handler (10) is appropriate, and the humidity information indicates the deficient humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(13) The air supply adjustment unit (56) transmits the to-be-supplied-air-temperature decreasing signal to the outdoor-air-handler control unit (31) in the case where the dehumidification information indicates that condensed water is generated at the indoor heat exchanger (22a), the heating capacity information indicates that the heating capacity of the outdoor air handler (10) is deficient, and the humidity information indicates the excessive humidification state.

In response to the outdoor-air-handler control unit (31) decreasing the set to-be-supplied air temperature Ts_set, the to-be-supplied air temperature of the outdoor air handler (10) decreases. Also, the amount of humidification of the humidifier (13) decreases, and thus the absolute humidity of the to-be-supplied air (SOA) decreases. As a result, the dehumidification information expectedly changes to information indicating that no condensed water is generated at the indoor heat exchanger (22a). In addition, the heating capacity information is expectedly maintained to be the information indicating that the heating capacity of the outdoor air handler (10) is deficient. Further, the humidity information expectedly changes to the appropriate humidification state.

(14) The air supply adjustment unit (56) transmits the to-be-supplied-air-temperature maintaining signal to the outdoor-air-handler control unit (31) in the case where the dehumidification information indicates that condensed water is generated at the indoor heat exchanger (22a), the heating capacity information indicates that the heating capacity of the outdoor air handler (10) is deficient, and the humidity information indicates the appropriate humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(15) The air supply adjustment unit (56) transmits the to-be-supplied-air-temperature increasing signal to the outdoor-air-handler control unit (31) in the case where the dehumidification information indicates that condensed water is generated at the indoor heat exchanger (22a), the heating capacity information indicates that the heating capacity of the outdoor air handler (10) is deficient, and the humidity information indicates the deficient humidification state.

In response to the outdoor-air-handler control unit (31) increasing the set to-be-supplied air temperature Ts_set, the to-be-supplied air temperature of the outdoor air handler (10) increases. Also, the amount of humidification of the humidifier (13) increases, and thus the absolute humidity of the to-be-supplied air (SOA) increases. As a result, the dehumidification information is expectedly maintained to be the information indicating that condensed water is generated at the indoor heat exchanger (22a). In addition, the heating capacity information expectedly changes to information indicating that the heating capacity of the outdoor air handler (10) is appropriate. Further, the humidity information expectedly changes to the appropriate humidification state.

(16) The air supply adjustment unit (56) transmits the to-be-supplied-air-temperature maintaining signal to the outdoor-air-handler control unit (31) in the case where the dehumidification information indicates that no condensed water is generated at the indoor heat exchanger (22a), the heating capacity information indicates that the heating capacity of the outdoor air handler (10) is deficient, and the humidity information indicates the excessive humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(17) The air supply adjustment unit (56) transmits the to-be-supplied-air-temperature maintaining signal to the outdoor-air-handler control unit (31) in the case where the dehumidification information indicates that no condensed water is generated at the indoor heat exchanger (22a), the heating capacity information indicates that the heating capacity of the outdoor air handler (10) is deficient, and the humidity information indicates the appropriate humidification state.

In response to the outdoor-air-handler control unit (31) maintaining the set to-be-supplied air temperature Ts_set, the to-be-supplied air temperature of the outdoor air handler (10) does not change. Also, the amount of humidification of the humidifier (13) does not change, and thus the absolute humidity of the to-be-supplied air (SOA) does not change. As a result, each of the dehumidification information, the heating capacity information, and the humidity information is expectedly to be the same information as the previous one.

(18) The air supply adjustment unit (56) transmits the to-be-supplied-air-temperature increasing signal to the outdoor-air-handler control unit (31) in the case where the dehumidification information indicates that no condensed water is generated at the indoor heat exchanger (22a), the heating capacity information indicates that the heating capacity of the outdoor air handler (10) is deficient, and the humidity information indicates the deficient humidification state.

In response to the outdoor-air-handler control unit (31) increasing the set to-be-supplied air temperature Ts_set, the to-be-supplied air temperature of the outdoor air handler (10) increases. Also, the amount of humidification of the humidifier (13) increases, and thus the absolute humidity of the to-be-supplied air (SOA) increases. As a result, the dehumidification information expectedly changes to information indicating that condensed water is generated at the indoor heat exchanger (22a). In addition, the heating capacity information expectedly changes to information indicating that the heating capacity of the outdoor air handler (10) is appropriate. Further, the humidity information expectedly changes to the appropriate humidification state.

<Evaporation Temperature Adjustment Unit>

The evaporation temperature adjustment unit (57) adjusts the target evaporation temperature Te_tg on the basis of the dehumidification information.

The evaporation temperature adjustment unit (57) selects one of an evaporation-temperature increasing signal and an evaporation-temperature maintaining signal on the basis of the dehumidification information, and transmits the selected signal to the outdoor-unit control unit (32a). The evaporation-temperature increasing signal is a signal for giving an instruction for increasing the target evaporation temperature Te_tg by a predetermined value (for example, 1° C.). The evaporation-temperature maintaining signal is a signal for giving an instruction for not changing the target evaporation temperature Te_tg.

The outdoor-unit control unit (32a) increases the target evaporation temperature Te_tg by the predetermined value in response to receiving the evaporation-temperature increasing signal, and maintains the value of the target evaporation temperature Te_tg in response to receiving the evaporation-temperature maintaining signal. The outdoor-unit control unit (32a) then controls the operating capacity of the compressor (21a) by using the updated target evaporation temperature Te_tg.

The evaporation temperature adjustment unit (57) transmits the evaporation-temperature increasing signal to the outdoor-unit control unit (32a) in the case where the dehumidification information indicates that condensed water is generated at the indoor heat exchanger (22a).

In response to the outdoor-unit control unit (32a) increasing the target evaporation temperature Te_tg during the cooling operation, the evaporation temperature of the refrigerant at the indoor heat exchanger (22a) increases. Accordingly, the surface temperature of the fin of the indoor heat exchanger (22a) increases. As a result, a difference between the surface temperature of the fin of the indoor heat exchanger (22a) and a dew-point temperature of the indoor air reduces, and an amount of condensed water generated at the indoor heat exchanger (22a) decreases. In addition, when the surface temperature of the fin of the indoor heat exchanger (22a) exceeds the dew-point temperature of the indoor air, condensed water is no longer generated at the indoor heat exchanger (22a).

The evaporation temperature adjustment unit (57) transmits the evaporation-temperature maintaining signal to the outdoor-unit control unit (32a) in the case where the dehumidification information indicates that no condensed water is generated at the indoor heat exchanger (22a). In this case, the outdoor-unit control unit (32a) maintains the target evaporation temperature Te_tg without changing. Thus, in this case, no condensed water is continuously generated at the indoor heat exchanger (22a).

—Feature (1) of Embodiment—

The air conditioning system (100) according to the present embodiment includes the outdoor air handler (10) and the air conditioner (20). The outdoor air handler (10) treats taken-in outdoor air and supplies the treated air to the target space (SP1). The air conditioner (20) treats indoor air taken in from the target space (SP1) and supplies the treated air to the target space (SP1).

The air conditioning system (100) according to the present embodiment further includes the control device (30). When the outdoor air handler (10) performs the heating humidifying operation for heating and humidifying the outdoor air and the air conditioner (20) performs the cooling operation for cooling the indoor air, the control device (30) adjusts a to-be-supplied air temperature of the outdoor air handler (10) and a cooling temperature that is a temperature at the indoor heat exchanger (22a) during the cooling operation on the basis of dehumidification information, operation information, temperature information, and humidity information.

The dehumidification information is information regarding an amount of condensed water generated in the air conditioner (20). The operation information is information regarding an operating state of the air conditioner (20). The temperature information is information regarding a relationship between an air temperature in the target space (SP1) and a set indoor temperature Tr_set. The humidity information is information regarding a relationship between a humidity in the target space (SP1) and a set indoor humidity Xr_set. A to-be-supplied air temperature Ts is a temperature of the treated outdoor air to be supplied to the target space (SP1) by the outdoor air handler (10). The cooling temperature is a temperature (surface temperature Tsf of the fin in the present embodiment) at the indoor heat exchanger (22a) configured to cool the indoor air during the cooling operation.

In the air conditioning system (100) according to the present embodiment, when the outdoor air handler (10) performs the heating humidifying operation and the air conditioner (20) performs the cooling operation, the control device (30) adjusts the temperature (to-be-supplied air temperature) of the treated outdoor air to be supplied to the target space (SP1) by the outdoor air handler (10) and the temperature (cooling temperature) at the indoor heat exchanger (22a) of the air conditioner (20) by taking into account the operation information regarding the operating state of the air conditioner (20). Thus, according to the present embodiment, the air conditioning system (100) can be appropriately controlled when cooling and humidification are concurrently performed in a room.

—Feature (2) of Embodiment—

In the cooling operation, the air conditioner (20) according to the present embodiment selectively performs a cooling action for cooling the indoor air and a suspending action for suspending cooling of the indoor air.

The dehumidification information is information indicating whether or not condensed water is generated in the air conditioner (20). The operation information is information indicating which of the cooling action or the suspending action the air conditioner (20) is performing.

The temperature information is information indicating any of an appropriate heating state, an excessive heating state, and a deficient heating state. The appropriate heating state is a state in which the air temperature (the measured value Tr obtained by the indoor temperature sensor (64) in the present embodiment) in the target space (SP1) is in a predetermined set temperature range (the indoor temperature range Tr_set±ΔTr in the present embodiment) that includes the set indoor temperature Tr_set. The excessive heating state is a state in which the air temperature in the target space (SP1) is higher than an upper-limit value of the set temperature range. The deficient heating state is a state in which the air temperature in the target space (SP1) is lower than a lower-limit value of the set temperature range.

The humidity information is information indicating any of an appropriate humidification state, an excessive humidification state, and a deficient humidification state. The appropriate humidification state is a state in which the humidity (the absolute humidity Xr of the indoor air in the present embodiment) in the target space (SP1) is in a predetermined set humidity range (the indoor humidity range Xr_set±ΔXr in the present embodiment) that includes the set indoor humidity Xr_set. The excessive humidification state is a state in which the humidity in the target space (SP1) is higher than an upper-limit value of the set humidity range. The deficient humidification state is a state in which the humidity in the target space (SP1) is lower than a lower-limit value of the set humidity range.

In the present embodiment, each of the dehumidification information, the operation information, the temperature information, and the humidity information is concretized. The operation information is information indicating which of the cooling action or the suspending action the air conditioner (20) is performing. Therefore, according to the present embodiment, the air conditioning system (100) can be controlled by taking into account which of the cooling action or the suspending action the air conditioner (20) is performing when cooling and humidification are concurrently performed in a room.

—Feature (3) of Embodiment—

The control device (30) according to the present embodiment creates heating capacity information that indicates whether a heating capacity of the outdoor air handler (10) is appropriate, excessive, or deficient, based on the operation information and the temperature information. This control device (30) also adjusts the to-be-supplied air temperature and the cooling temperature, based on the dehumidification information, the humidity information, and the heating capacity information.

The control device (30) according to the present embodiment creates the heating capacity information on the basis of the operation information and the temperature information. The control device (30) then controls the air conditioning system (100) on the basis of the dehumidification information, the humidity information, and the heating capacity information when cooling and humidification are concurrently performed in a room.

—Feature (4) of Embodiment—

The control device (30) according to the present embodiment sets, as the heating capacity information, information indicating that the heating capacity of the outdoor air handler (10) is excessive regardless of the operation information in the case where the temperature information indicates the excessive heating state. In addition, this control device (30) sets, as the heating capacity information, information indicating that the heating capacity of the outdoor air handler (10) is excessive in the case where the operation information indicates that the air conditioner (20) performs the cooling action and the temperature information indicates the appropriate heating state. In addition, this control device (30) sets, as the heating capacity information, information indicating that the heating capacity of the outdoor air handler (10) is appropriate in the case where the operation information indicates that the air conditioner (20) performs the suspending action and the temperature information indicates the appropriate heating state. In addition, this control device (30) sets, as the heating capacity information, information indicating that the heating capacity of the outdoor air handler (10) is deficient regardless of the operation information in the case where the temperature information indicates the deficient heating state.

In the present embodiment, the heating capacity information is concretized.

When the air conditioner (20) is performing the cooling action and the air temperature in the target space (SP1) is in the set temperature range, the air temperature in the target space (SP1) can be maintained to be in the set temperature range by adjusting a cooling capacity of the air conditioner (20) even if the heating capacity of the outdoor air handler (10) is reduced. Accordingly, in this case, the control device (30) sets, as the heating capacity information, information indicating that the heating capacity of the outdoor air handler (10) is excessive.

When the air conditioner (20) is performing the suspending action and the air temperature in the target space (SP1) is in the set temperature range, the heating capacity of the outdoor air handler (10) needs to be maintained at the current state in order to maintain the air temperature in the target space (SP1) to be in the set temperature range. Accordingly, in this case, the control device (30) sets, as the heating capacity information, information indicating that the heating capacity of the outdoor air handler (10) is appropriate.

In the case where the air temperature in the target space (SP1) is below the lower-limit value of the set temperature range, the heating capacity of the outdoor air handler (10) needs to be increased in order to bring the air temperature in the target space (SP1) to be in the set temperature range when the air conditioner (20) is performing the cooling action and the suspending action. Accordingly, in this case, the control device (30) sets, as the heating capacity information, information indicating that the heating capacity of the outdoor air handler (10) is deficient.

—Feature (5) of Embodiment—

When the dehumidification information indicates that condensed water is generated in the air conditioner (20) and the heating capacity information indicates that the heating capacity of the outdoor air handler (10) is excessive, the control device (30) according to the present embodiment decreases the to-be-supplied air temperature regardless of the humidity information.

When each of the dehumidification information and the heating capacity information is predetermined information, the control device (30) according to the present embodiment decreases the to-be-supplied air temperature even if the humidity information indicates any of the appropriate humidification state, the excessive humidification state, and the deficient humidification state.

When the heating capacity information indicates that the heating capacity of the outdoor air handler (10) is excessive, the air temperature in the target space (SP1) is highly likely to be in the set temperature range even if the heating capacity of the outdoor air handler (10) decreases. If the temperature of the treated outdoor air to be supplied to the target space (SP1) by the outdoor air handler (10) decreases, an amount of moisture (an amount of humidification) added to the outdoor air by the outdoor air handler (10) decreases. As a result, an amount of condensed water generated in the air conditioner (20) decreases.

—Feature (6) of Embodiment—

When the dehumidification information indicates that no condensed water is generated in the air conditioner (20) and the heating capacity information indicates that the heating capacity of the outdoor air handler (10) is excessive, the control device (30) according to the present embodiment decreases the to-be-supplied air temperature in the case where the humidity information indicates the excessive humidification state and does not change the to-be-supplied air temperature in the case where the humidity information indicates the appropriate humidification state or the deficient humidification state.

When each of the dehumidification information and the heating capacity information is predetermined information, the control device (30) according to the present embodiment selects decreasing the to-be-supplied air temperature or maintaining the to-be-supplied air temperature without changing in accordance with the humidity information.

When the dehumidification information indicates that no condensed water is generated in the air conditioner (20), condensed water is still not to be generated in the air conditioner (20) unless the to-be-supplied air temperature is increased and thus the amount of humidification of the outdoor air handler (10) increases.

Accordingly, in this case, when the heating capacity information indicates that the heating capacity of the outdoor air handler (10) is excessive and the humidity information indicates the excessive humidification state, the control device (30) decreases the to-be-supplied air temperature to decrease the heating capacity and the humidifying capacity of the outdoor air handler (10).

On the other hand, in this case, when the heating capacity information indicates that the heating capacity of the outdoor air handler (10) is excessive and the humidity information indicates the appropriate humidification state or the deficient humidification state, the control device (30) does not change the to-be-supplied air temperature. As a result, the humidifying capacity of the outdoor air handler (10) is maintained to be constant.

—Feature (7) of Embodiment—

When the dehumidification information indicates that condensed water is generated in the air conditioner (20) and the heating capacity information indicates that the heating capacity of the outdoor air handler (10) is appropriate, the control device (30) according to the present embodiment decreases the to-be-supplied air temperature in the case where the humidity information indicates the excessive humidification state and does not change the to-be-supplied air temperature in the case where the humidity information indicates the appropriate humidification state or the deficient humidification state.

When each of the dehumidification information and the heating capacity information is predetermined information, the control device (30) according to the present embodiment selects decreasing the to-be-supplied air temperature or maintaining the to-be-supplied air temperature without changing in accordance with the humidity information.

When no condensed water is generated in the air conditioner (20), it is desirable to decrease the to-be-supplied air temperature and thus reduce the humidifying capacity of the outdoor air handler (10). However, if the to-be-supplied air temperature decreases, the temperature and the humidity of the indoor air may decrease.

Accordingly, in this case, when the heating capacity information indicates that the heating capacity of the outdoor air handler (10) is appropriate and the humidity information indicates the excessive humidification state, the control device (30) decreases the to-be-supplied air temperature and thus decreases the heating capacity and the humidifying capacity of the outdoor air handler (10). As a result, an amount of condensed water generated in the air conditioner (20) decreases.

On the other hand, in this case, when the heating capacity information indicates that the heating capacity of the outdoor air handler (10) is appropriate and the humidity information indicates the appropriate humidification state or the deficient humidification state, the control device (30) does not change the to-be-supplied air temperature and thus maintains the heating capacity and the humidifying capacity of the outdoor air handler (10).

—Feature (8) of Embodiment—

When the dehumidification information indicates that no condensed water is generated in the air conditioner (20) and the heating capacity information indicates that the heating capacity of the outdoor air handler (10) is appropriate, the control device (30) according to the present embodiment does not change the to-be-supplied air temperature regardless of the humidity information.

When each of the dehumidification information and the heating capacity information is predetermined information, the control device (30) according to the present embodiment does not change the to-be-supplied air temperature even if the humidity information indicates any of the appropriate humidification state, the excessive humidification state, and the deficient humidification state.

When no condensed water is generated in the air conditioner (20), condensed water is still not to be generated in the air conditioner (20) unless the to-be-supplied air temperature is changed. Accordingly, in this case, when the heating capacity information indicates that the heating capacity of the outdoor air handler (10) is appropriate, the control device (30) does not change the to-be-supplied air temperature even if the humidity information indicates any state. As a result, the humidifying capacity of the outdoor air handler (10) is maintained to be constant, and generation of condensed water in the air conditioner (20) is avoided.

—Feature (9) of Embodiment—

When the dehumidification information indicates that condensed water is generated in the air conditioner (20) and the heating capacity information indicates that the heating capacity of the outdoor air handler (10) is deficient, the control device (30) according to the present embodiment decreases the to-be-supplied air temperature in the case where the humidity information indicates the excessive humidification state, does not change the to-be-supplied air temperature in the case where the humidity information indicates the appropriate humidification state, and increases the to-be-supplied air temperature in the case where the humidity information indicates the deficient humidification state.

When each of the dehumidification information and the heating capacity information is predetermined information, the control device (30) according to the present embodiment selects decreasing the to-be-supplied air temperature, maintaining the to-be-supplied air temperature without changing, or increasing the to-be-supplied air temperature in accordance with the humidity information.

When the dehumidification information indicates condensed water is generated in the air conditioner (20) and the humidity information indicates the excessive humidification state, the control device (30) decreases the to-be-supplied air temperature even if the heating capacity information indicates that the heating capacity of the outdoor air handler (10) is deficient. As a result, the humidifying capacity of the outdoor air handler (10) decreases, and an amount of condensed water generated in the air conditioner (20) decreases.

When the dehumidification information indicates that condensed water is generated in the air conditioner (20) and the humidity information indicates the appropriate humidification state, the control device (30) does not change the to-be-supplied air temperature even if the heating capacity information indicates that the heating capacity of the outdoor air handler (10) is deficient. As a result, the humidity of the indoor air is maintained to be in the set humidity range.

When the heating capacity information indicates that the heating capacity of the outdoor air handler (10) is deficient and the humidity information indicates the deficient humidification state, the control device (30) increases the to-be-supplied air temperature even if the dehumidification information indicates that condensed water is generated in the air conditioner (20). As a result, the temperature of the indoor air approaches the set temperature range and the humidity of the indoor air approaches the set humidity range.

—Feature (10) of Embodiment—

When the dehumidification information indicates that no condensed water is generated in the air conditioner (20) and the heating capacity information indicates that the heating capacity of the outdoor air handler (10) is deficient, the control device (30) according to the present embodiment does not change the to-be-supplied air temperature in the case where the humidity information indicates the excessive humidification state or the appropriate humidification state and increases the to-be-supplied air temperature in the case where the humidity information indicates the deficient humidification state.

When each of the dehumidification information and the heating capacity information is predetermined information, the control device (30) according to the present embodiment selects maintaining the to-be-supplied air temperature without changing or increasing the to-be-supplied air temperature in accordance with the humidity information.

When no condensed water is generated in the air conditioner (20), there is a possibility that the air conditioner (20) can be maintained in the state in which no condensed water is generated even if the humidifying capacity of the outdoor air handler (10) is increased to some extent.

Accordingly, in this case, when the heating capacity information indicates that the heating capacity of the outdoor air handler (10) is deficient and the humidity information indicates the excessive humidification state or the appropriate humidification state, the control device (30) maintains the to-be-supplied air temperature without changing.

On the other hand, in this case, when the heating capacity information indicates that the heating capacity of the outdoor air handler (10) is deficient and the humidity information indicates the deficient humidification state, the control device (30) increases the to-be-supplied air temperature. As a result, the humidifying capacity of the outdoor air handler (10) increases, and thus the humidity of the indoor air enters the set humidity range.

—Feature (11) of Embodiment—

When the dehumidification information indicates that condensed water is generated in the air conditioner (20), the control device (30) according to the present embodiment increases the cooling temperature regardless of the heating capacity information and the humidity information.

When the dehumidification information according to the present embodiment indicates that condensed water is generated in the air conditioner (20), the control device (30) increases the cooling temperature even if each of the heating capacity information and the humidity information is any information. As a result, a difference between the dew-point temperature of the indoor air that flows to the indoor heat exchanger (22a) of the air conditioner (20) and the cooling temperature reduces, and an amount of condensed water generated in the air conditioner (20) decreases.

—Feature (12) of Embodiment—

When the dehumidification information indicates that no condensed water is generated in the air conditioner (20), the control device (30) according to the present embodiment does not change the cooling temperature regardless of the heating capacity information and the humidity information.

When the dehumidification information indicates that no condensed water is generated in the air conditioner (20), the control device (30) according to the present embodiment maintains the cooling temperature without changing even if each of the heating capacity information and the humidity information is any information. As a result, the state in which no condensed water is generated in the air conditioner (20) continues.

—Modification 1 of Embodiment—

The evaporation temperature adjustment unit (57) may be omitted from the control device according to the present embodiment. A control device (30) according to the present modification adjusts the set to-be-supplied air temperature Ts_set on the basis of the dehumidification information, the heating capacity information, and the humidity information but does not adjust the target evaporation temperature Te_tg on the basis of the dehumidification information.

—Modification 2 of Embodiment—

The indoor-unit control unit (32b) according to the present embodiment may be configured to determine whether condensed water is generated on the surface of the fin of the indoor heat exchanger (22a) on the basis of an output of a dewing sensor attached to the indoor heat exchanger (22a).

In addition, the indoor-unit control unit (32b) according to the present embodiment may be configured to determine whether condensed water is generated on the surface of the fin of the indoor heat exchanger (22a) on the basis of an image obtained by a camera that captures an image of the indoor heat exchanger (22a).

—Modification 3 of Embodiment—

In the control device (30) according to the present embodiment, the air supply adjustment unit (56) may be configured to adjust a to-be-supplied air flow rate of the outdoor air handler (10) on the basis of the dehumidification information, the heating capacity information, and the humidity information.

The air supply adjustment unit (56) according to the present modification selects any one of a to-be-supplied-air-flow-rate increasing signal, a to-be-supplied-air-flow-rate maintaining signal, and a to-be-supplied-air-flow-rate decreasing signal on the basis of the dehumidification information, the heating capacity information, and the humidity information, and transmits the selected signal to the outdoor-air-handler control unit (31).

The outdoor-air-handler control unit (31) increases a rotational speed of the air supply fan (14) by a predetermined value in response to receiving the to-be-supplied-air-flow-rate increasing signal, maintains the rotational speed of the air supply fan (14) in response to receiving the to-be-supplied-air-flow-rate maintaining signal, and decreases the rotational speed of the air supply fan (14) by a predetermined value in response to receiving the to-be-supplied-air-flow-rate decreasing signal. When the rotational speed of the air supply fan (14) increases, the to-be-supplied air flow rate of the outdoor-air-handler control unit (31) increases. When the rotational speed of the air supply fan (14) does not change, the to-be-supplied air flow rate of the outdoor-air-handler control unit (31) does not change. When the rotational speed of the air supply fan (14) decreases, the to-be-supplied air flow rate of the outdoor-air-handler control unit (31) decreases.

As illustrated in FIG. 5, in the case where the air supply adjustment unit (56) according to the above-described embodiment outputs the to-be-supplied-air-temperature increasing signal, the air supply adjustment unit (56) according to the present modification outputs the to-be-supplied-air-flow-rate increasing signal instead of the to-be-suppliedair-temperature increasing signal. When the outdoor-air-handler control unit (31) having received the to-be-supplied-air-flow-rate increasing signal increases the rotational speed of the air supply fan (14), the flow rate of the outdoor air that passes through the humidifier (13) increases. As a result, the amount of humidification of the humidifier (13) increases, and thus the absolute humidity of the to-be-supplied air (SOA) increases.

In the case where the air supply adjustment unit (56) according to the above-described embodiment outputs the to-be-supplied-air-temperature maintaining signal, the air supply adjustment unit (56) according to the present modification outputs the to-be-supplied-air-flow-rate maintaining signal instead of the to-be-supplied-air-temperature maintaining signal. When the outdoor-air-handler control unit (31) having received the to-be-supplied-air-flow-rate maintaining signal maintains the rotational speed of the air supply fan (14), the flow rate of the outdoor air that passes through the humidifier (13) does not change. Thus, the amount of humidification of the humidifier (13) does not change, and thus the absolute humidity of the to-be-supplied air (SOA) does not change.

In the case where the air supply adjustment unit (56) according to the above-described embodiment outputs the to-be-supplied-air-temperature decreasing signal, the air supply adjustment unit (56) according to the present modification outputs the to-be-supplied-air-flow-rate decreasing signal instead of the to-be-supplied-air-temperature decreasing signal. When the outdoor-air-handler control unit (31) having received the to-be-supplied-air-flow-rate decreasing signal decreases the rotational speed of the air supply fan (14), the flow rate of the outdoor air that passes through the humidifier (13) decreases. As a result, the amount of humidification of the humidifier (13) decreases, and thus the absolute humidity of the to-be-supplied air (SOA) decreases.

Note that the air supply adjustment unit (56) according to the present modification may be configured to adjust both the set to-be-supplied air temperature Ts_set and the rotational speed of the air supply fan (14). In this case, in the case where the air supply adjustment unit (56) according to the above-described embodiment outputs the to-be-supplied-air-temperature increasing signal, the air supply adjustment unit (56) according to the present modification outputs both the to-be-supplied-air-temperature increasing signal and the to-be-supplied-air-flow-rate increasing signal. In addition, in the case where the air supply adjustment unit (56) according to the above-described embodiment outputs the to-be-supplied-air-temperature maintaining signal, the air supply adjustment unit (56) according to the present modification outputs both the to-be-supplied-air-temperature maintaining signal and the to-be-supplied-air-flow-rate maintaining signal. In addition, in the case where the air supply adjustment unit (56) according to the above-described embodiment outputs the to-be-supplied-air-temperature decreasing signal, the air supply adjustment unit (56) according to the present modification outputs both the to-be-supplied-air-temperature decreasing signal and the to-be-supplied-air-flow-rate decreasing signal.

—Modification 4 of Embodiment—

In the control device (30) according to the present embodiment, the air supply adjustment unit (56) may be configured to adjust a to-be-supplied water flow rate of the outdoor air handler (10) on the basis of the dehumidification information, the heating capacity information, and the humidity information.

The air supply adjustment unit (56) according to the present modification selects any one of a to-be-supplied-water-flow-rate increasing signal, a to-be-supplied-water-flow-rate maintaining signal, and a to-be-supplied-water-flow-rate decreasing signal on the basis of the dehumidification information, the heating capacity information, and the humidity information, and transmits the selected signal to the outdoor-air-handler control unit (31). The outdoor-air-handler control unit (31) increases the to-be-supplied water flow rate by a predetermined value in response to receiving the to-be-supplied-water-flow-rate increasing signal, maintains the to-be-supplied water flow rate in response to receiving the to-be-supplied-air-flow-rate maintaining signal, and decreases the to-be-supplied water flow rate by a predetermined value in response to receiving the to-be-supplied-air-flow-rate decreasing signal.

As described above, the to-be-supplied water flow rate is a flow rate of water for humidification to be supplied to the humidifier (13). When the to-be-supplied water flow rate increases, the amount of humidification of the humidifier (13) increases. When the to-be-supplied water flow rate does not change, the amount of humidification of the humidifier (13) does not change. When the to-be-supplied water flow rate decreases, the amount of humidification of the humidifier (13) decreases.

In the case where the air supply adjustment unit (56) according to the above-described embodiment outputs the to-be-supplied-air-temperature increasing signal, the air supply adjustment unit (56) according to the present modification outputs the to-be-supplied-water-flow-rate increasing signal instead of the to-be-supplied-air-temperature increasing signal or along with the to-be-supplied-air-temperature increasing signal. In addition, in the case where the air supply adjustment unit (56) according to the above-described embodiment outputs the to-be-supplied-air-temperature maintaining signal, the air supply adjustment unit (56) according to the present modification outputs the to-be-supplied-water-flow-rate maintaining signal instead of the to-be-supplied-air-temperature maintaining signal or along with the to-be-supplied-air-temperature increasing signal. In addition, in the case where the air supply adjustment unit (56) according to the above-described embodiment outputs the to-be-supplied-air-temperature decreasing signal, the air supply adjustment unit (56) according to the present modification outputs the to-be-supplied-water-flow-rate decreasing signal instead of the to-be-supplied-air-temperature decreasing signal or along with the to-be-supplied-air-temperature increasing signal.

While the embodiment and modifications have been described above, it should be understood that various modifications can be made on the configurations and details without departing from the gist and the scope of the claims. The embodiment and modifications described above may be combined or replaced as appropriate unless the functionality of the target of the present disclosure is reduced.

INDUSTRIAL APPLICABILITY

As described above, the present disclosure is useful for an air conditioning system.

REFERENCE SIGNS LIST

10 outdoor air handler
20 air conditioner
22a indoor heat exchanger
30 control device
100 air conditioning system
SP1 target space

The invention claimed is:

1. An air conditioning system including
an outdoor air handler configured to treat taken-in outdoor air and supply the treated air to a target space, and
an air conditioner configured to treat indoor air taken in from the target space and supply the treated air to the target space, the air conditioning system comprising:
a control device configured to, when the outdoor air handler performs a heating humidifying operation for heating and humidifying the outdoor air and the air conditioner performs a cooling operation for cooling the indoor air, adjust at least one of a to-be-supplied air temperature that is a temperature of the treated outdoor air to be supplied to the target space by the outdoor air handler, a to-be-supplied air flow rate that is a flow rate of the outdoor air to be supplied to the target space by the outdoor air handler, and a to-be-supplied water flow rate that is a flow rate of water for humidification to be supplied to the outdoor air handler, based on dehumidification information regarding an amount of condensed water generated in the air conditioner, operation information regarding an operating state of the air conditioner, temperature information regarding a relationship between an air temperature in the target space and a set temperature, and humidity information regarding a relationship between a humidity in the target space and a set humidity, wherein
in the cooling operation, the air conditioner selectively performs a cooling action for cooling the indoor air and a suspending action for suspending cooling of the indoor air,
the dehumidification information is information indicating whether or not condensed water is generated in the air conditioner,
the operation information is information indicating which of the cooling action or the suspending action the air conditioner is performing,
the temperature information is information indicating any of an appropriate heating state in which the air temperature in the target space is in a predetermined set temperature range including the set temperature, an excessive heating state in which the air temperature in the target space is higher than an upper-limit value of the set temperature range, and a deficient heating state in which the air temperature in the target space is lower than a lower-limit value of the set temperature range,
the humidity information is information indicating any of an appropriate humidification state in which the humidity in the target space is in a predetermined set humidity range including the set humidity, an excessive humidification state in which the humidity in the target space is higher than an upper-limit value of the set humidity range, and a deficient humidification state in which the humidity in the target space is lower than a lower-limit value of the set humidity range, and
the control device
creates, based on the operation information and the temperature information, heating capacity information indicating whether a heating capacity of the outdoor air handler is appropriate, excessive, or deficient, and
adjusts at least one of the to-be-supplied air temperature, the to-be-supplied air flow rate, and the to-be-supplied water flow rate, based on the dehumidification information, the humidity information, and the heating capacity information.

2. The air conditioning system according to claim 1, wherein
the control device
sets, as the heating capacity information, information indicating that the heating capacity of the outdoor air handler is excessive regardless of the operation information in a case where the temperature information indicates the excessive heating state,
sets, as the heating capacity information, information indicating that the heating capacity of the outdoor air handler is excessive in a case where the operation information indicates that the air conditioner performs the cooling action and the temperature information indicates the appropriate heating state,
sets, as the heating capacity information, information indicating that the heating capacity of the outdoor air handler is appropriate in a case where the operation information indicates that the air conditioner performs the suspending action and the temperature information indicates the appropriate heating state, and
sets, as the heating capacity information, information indicating that the heating capacity of the outdoor air handler is deficient regardless of the operation information in a case where the temperature information indicates the deficient heating state.

3. The air conditioning system according to claim 2, wherein
the control device,
when the dehumidification information indicates that condensed water is generated in the air conditioner and the heating capacity information indicates that the heating capacity of the outdoor air handler is excessive,
decreases at least one of the to-be-supplied air temperature and the to-be-supplied air flow rate regardless of the humidity information.

4. The air conditioning system according to claim 2, wherein
the control device,
when the dehumidification information indicates that no condensed water is generated in the air conditioner and the heating capacity information indicates that the heating capacity of the outdoor air handler is excessive,
decreases at least one of the to-be-supplied air temperature and the to-be-supplied air flow rate in a case where the humidity information indicates the excessive humidification state, and
changes neither the to-be-supplied air temperature nor the to-be-supplied air flow rate in a case where the humidity information indicates the appropriate humidification state or the deficient humidification state.

5. The air conditioning system according to claim 2, wherein
the control device,
when the dehumidification information indicates that condensed water is generated in the air conditioner and the heating capacity information indicates that the heating capacity of the outdoor air handler is appropriate,
decreases at least one of the to-be-supplied air temperature and the to-be-supplied air flow rate in a case where the humidity information indicates the excessive humidification state, and changes neither the to-be-supplied air temperature nor the to-be-supplied air flow rate in a case where the humidity information indicates the appropriate humidification state or the deficient humidification state.

6. The air conditioning system according to claim 2, wherein the control device, when the dehumidification information indicates that no condensed water is generated in the air conditioner and the heating capacity information indicates that the heating capacity of the outdoor air handler is appropriate, changes neither the to-be-supplied air temperature nor the to-be-supplied air flow rate regardless of the humidity information.

7. The air conditioning system according to claim 2, wherein the control device, when the dehumidification information indicates that condensed water is generated in the air conditioner and the heating capacity information indicates that the heating capacity of the outdoor air handler is deficient, decreases at least one of the to-be-supplied air temperature and the to-be-supplied air flow rate in a case where the humidity information indicates the excessive humidification state, changes neither the to-be-supplied air temperature nor the to-be-supplied air flow rate in a case where the humidity information indicates the appropriate humidification state, and increases at least one of the to-be-supplied air temperature and the to-be-supplied air flow rate in a case where the humidity information indicates the deficient humidification state.

8. The air conditioning system according to claim 2, wherein the control device, when the dehumidification information indicates that no condensed water is generated in the air conditioner and the heating capacity information indicates that the heating capacity of the outdoor air handler is deficient, changes neither the to-be-supplied air temperature nor the to-be-supplied air flow rate in a case where the humidity information indicates the excessive humidification state or the appropriate humidification state, and increases at least one of the to-be-supplied air temperature and the to-be-supplied air flow rate in a case where the humidity information indicates the deficient humidification state.

* * * * *